United States Patent
Duffy et al.

(10) Patent No.: US 12,134,461 B2
(45) Date of Patent: Nov. 5, 2024

(54) APPARATUS FOR CONTROLLING MULTI-ROTOR VEHICLE VIBRATIONS AND RELATED METHODS

(71) Applicant: The Boeing Company, Arlington, VA (US)

(72) Inventors: Michael J. Duffy, Lansing, NY (US); Naveed Moayyed Hussain, Palos Verdes Peninsula, CA (US); Matthew Aaron Novick, Philadelphia, PA (US); John Jian Dong, Bothell, WA (US)

(73) Assignee: The Boeing Company, Arlington, VA (US)

( * ) Notice: Subject to any disclaimer, the term of this patent is extended or adjusted under 35 U.S.C. 154(b) by 1019 days.

(21) Appl. No.: 16/224,029

(22) Filed: Dec. 18, 2018

(65) Prior Publication Data
US 2020/0189722 A1    Jun. 18, 2020

(51) Int. Cl.
| | | |
|---|---|---|
| *B64C 11/50* | (2006.01) | |
| *B64C 11/00* | (2006.01) | |
| *B64U 30/20* | (2023.01) | |
| *B64U 50/13* | (2023.01) | |

(52) U.S. Cl.
CPC .......... *B64C 11/50* (2013.01); *B64C 11/008* (2013.01); *B64U 30/20* (2023.01); *B64U 50/13* (2023.01); *B64U 2201/00* (2023.01)

(58) Field of Classification Search
CPC .... B64C 11/50; B64C 11/008; B64C 2201/14
See application file for complete search history.

(56) References Cited

U.S. PATENT DOCUMENTS

| | | | |
|---|---|---|---|
| 5,150,855 A | 9/1992 | Kaptein | |
| 5,295,641 A | 3/1994 | Kaptein | |
| 5,453,943 A | 9/1995 | Magliozzi | |
| 11,192,633 B1 * | 12/2021 | Moro-Ludena | ......... B64C 29/02 |
| 2017/0274984 A1 * | 9/2017 | Beckman | ................ B64C 11/48 |
| 2018/0222577 A1 | 8/2018 | Goldman | |

(Continued)

FOREIGN PATENT DOCUMENTS

JP    6625918    12/2019

OTHER PUBLICATIONS

Cox, John, Ask the Captain: That sinking feeling right after takeoff, Jul. 31, 2016, USA Today, https://www.usatoday.com/story/travel/columnist/cox/2016/07/31/sinking-feeling-takeoff/87713282/ (Year: 2016).*

(Continued)

*Primary Examiner* — Philip J Bonzell
*Assistant Examiner* — Ashesh Dangol
(74) *Attorney, Agent, or Firm* — Hanley, Flight & Zimmerman, LLC

(57) ABSTRACT

Apparatus for controlling multi-rotor vehicle vibrations and related methods are disclosed herein. An example apparatus includes a vibration level detector to determine a vibration level of a frame of a vehicle based on data received from a sensor of the vehicle, the vehicle including a rotor. The apparatus includes a rotor operation analyzer to determine an operational parameter of the rotor based on the vibration level. The apparatus includes a communicator to transmit an instruction including the operational parameter to a controller of the rotor.

22 Claims, 8 Drawing Sheets

(56) References Cited

U.S. PATENT DOCUMENTS

2019/0047689 A1* 2/2019 Muren .................. A63H 27/12

OTHER PUBLICATIONS

European Patent Office, "Extended European Search Report," issued in connection with European Application No. 19211091.4, dated Mar. 5, 2020, 7 pages.
European Patent Office, "Communication Pursuant to Article 94(3) EPC," issued in connection with European Patent Application No. 19211091.4, dated Oct. 27, 2021, 6 pages.
Hammond, P.E et al., "Noise Reduction Efforts for Special Operations C-130 Aircraft Using Active Synchrophaser Control," Air Force Research Laboratory, Apr. 27, 1999, 4 pages.
European Patent Office, "Communication under Rule 71(3) EPC," issued in connection with European Patent Application No. 19 211 091.4, dated Jul. 7, 2022, 8 pages.
European Patent Office, "Decision to grant a European patent pursuant to Article 97(1) EPC," issued in connection with European Patent Application No. 19211091.4, dated Dec. 8, 2022, 2 pages.

* cited by examiner

APPARATUS FOR CONTROLLING MULTI-ROTOR VEHICLE VIBRATIONS AND RELATED METHODS

FIELD OF THE DISCLOSURE

This disclosure relates generally to vibration suppression and, more particularly, to apparatus for controlling multi-rotor vehicle vibrations and related methods.

BACKGROUND

A rotor of a vehicle such as an aircraft generates vibrations during, for instance, spinning of the blades of rotor. Vibrations generated during operation of the rotor can cause one or more portions of a frame of the vehicle to vibrate. Some vehicles include two or more rotors coupled to the vehicle frame.

SUMMARY

An example apparatus includes a vibration level detector to determine a vibration level of a frame of a vehicle based on data received from a sensor of the vehicle. The vehicle includes a rotor. The example apparatus includes a rotor operation analyzer to determine an operational parameter of the rotor based on the vibration level. The example apparatus includes a communicator to transmit an instruction including the operational parameter to a controller of the rotor.

Another example apparatus includes a sensor to generate sensor data during operation of a rotor of vehicle. The example apparatus includes a controller to determine a vibration level of at least a portion of the vehicle based on the sensor data and transmit an instruction to the rotor to one of maintain or adjust an operational parameter of the rotor based on the vibration level.

Another example apparatus includes a rotor operation analyzer to determine an operational parameter of a rotor of an aircraft based on a vibration mode of a frame of an aircraft and a communicator to transmit an instruction including the operational parameter to the rotor.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1A:
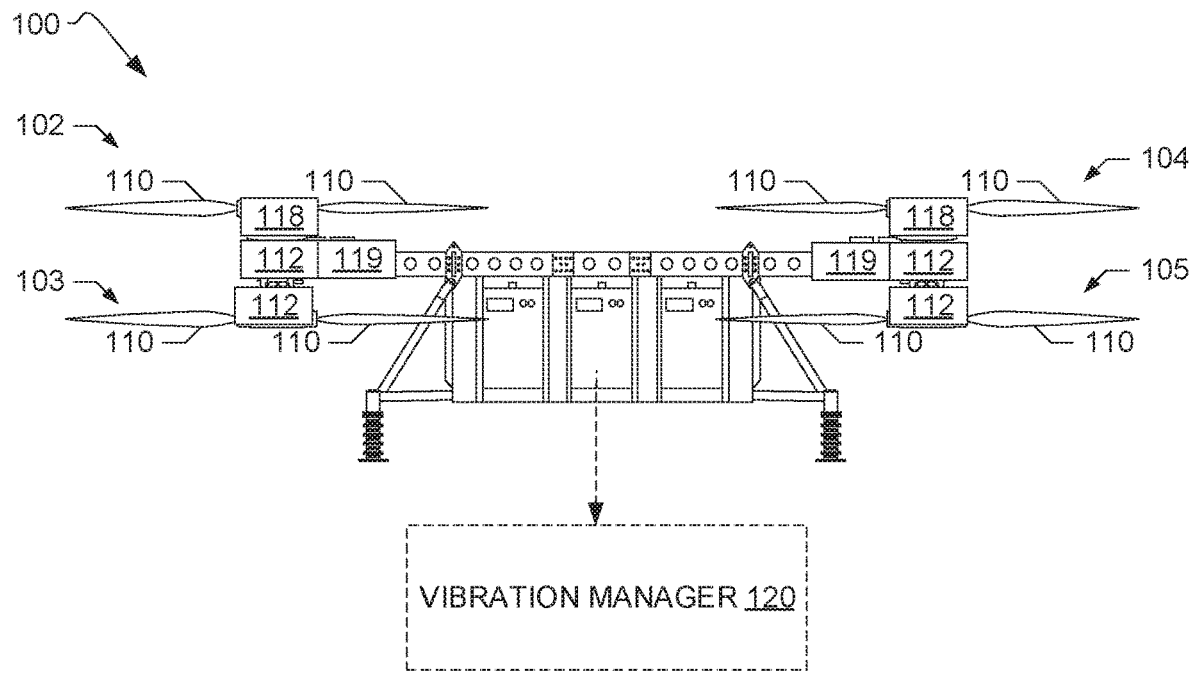
FIG. 1A illustrates a side view of an example multi-rotor vehicle including sensors to measure operational conditions of the vehicle and a vibration manager for controlling vibrations generated by the rotors in accordance with teachings of this disclosure.

A rotor of a vehicle such as an aircraft generates vibrations during, for instance, spinning of the blades of the rotor while the aircraft is in flight or while the aircraft is on the ground prior to takeoff or after landing. The vibrations generated by the rotor can be transmitted to the frame of the aircraft. Excessive vibrations can cause wear and/or damage to the aircraft frame and installations over time.

Some known methods for suppressing vibrations due to operation of the rotor(s) include adding damper(s) to the rotor(s) and/or to the vehicle frame. However, a damper may only suppress vibrations at a particular frequency based on tuning of the damper. Also, dampers can add weight to the aircraft. Other known vibration mitigation methods include increasing a stiffness of the materials used to form the rotor(s) and/or the frame and/or otherwise adding weight to the aircraft to structurally change the resonant or natural vibration modes of the rotor(s) and/or frame. Thus, known methods for suppressing vibrations result in structural changes to the aircraft.

Examples disclosed herein control vibrations experienced by a vehicle such as an aircraft due to operation of one or more rotors of the aircraft by controlling rotational speeds and/or rotational phases of the rotors. Based on sensor data generated by sensor(s) coupled to the rotor(s) and/or the aircraft frame, examples disclosed herein evaluate the vibrations experienced by the aircraft. In some examples, the sensors include accelerometer(s) (e.g., 3-axes accelerometer(s)) and/or position sensors to generate data indicative of the vibrations experienced by the aircraft. In some examples, the sensor(s) include angular position and angular velocity sensor(s) to collect data about operational parameters of the rotor(s) such as phase and speed. If the vibrations experienced by the aircraft exceed a predefined threshold, examples disclosed herein selectively adjust one or more operational parameters of the rotor(s), such as rotor speed and/or rotational phase between two or more rotors, to reduce and/or suppress the vibrations. Thus, examples disclosed herein control vibrations due to operation of the rotors without modifying the weight of the aircraft and/or otherwise structurally changing the body of the aircraft.

Some examples disclosed herein monitor changes in vibration levels at the particular sensor location(s) after the adjustment(s) to the rotor operational parameter(s) to determine the effectiveness of the adjustment(s) and to identify if additional adjustments are needed. Some examples disclosed herein assess the effects of the adjustment(s) to the rotor operational parameter(s) on performance of the aircraft with respect to, for instance, thrust, ceiling, endurance, etc. If the flight performance of the aircraft is adversely affected by the adjustments to the operation of the rotor(s), examples disclosed herein reevaluate the adjustments to the rotor(s) to optimize vibration suppression and vehicle performance.

As mentioned above, some examples disclosed herein dynamically monitor aircraft vibrations based on sensor data generated at specific locations of the aircraft. Some other examples disclosed herein automatically control vibrations based on an operational state of the vehicle, rotor speeds, and/or known vibration modes of the vehicle frame. For example, some examples disclosed herein identify an operational state of the vehicle (e.g., takeoff, landing, cruising, hover, on ground) and adjust the speed(s) of the rotor(s) based on the vehicle state and known vibration modes of the vehicle during the respective operational states. Some other examples monitor speed of the rotors and selectively adjust the speed of the rotors as the rotors pass through known resonant frequencies at particular speeds to prevent or reduce vibrations.

Figure 1B:
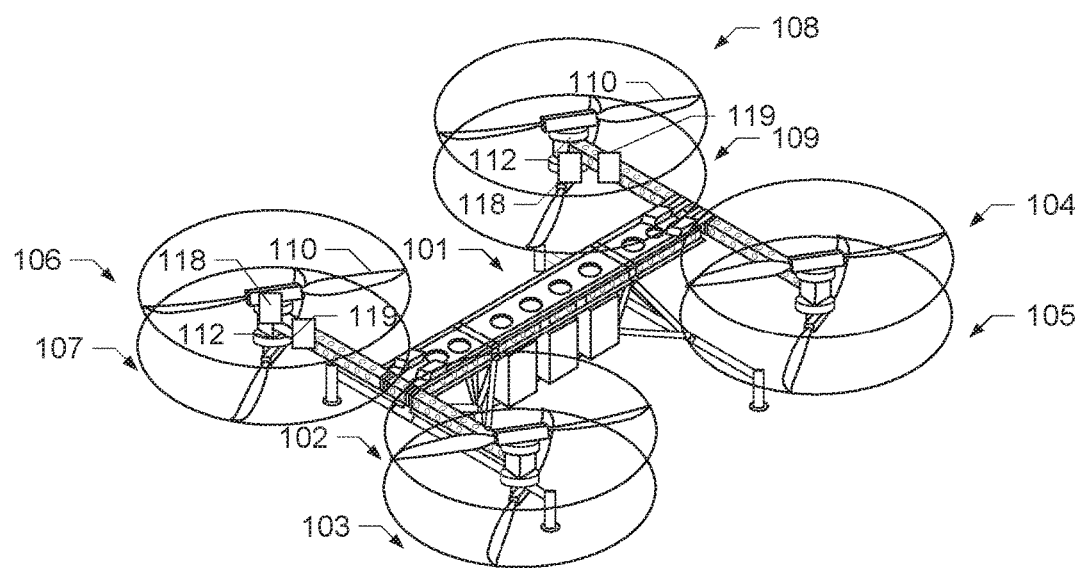
FIG. 1B is a perspective view of a portion of a frame of the vehicle of FIG. 1A.

FIG. 1A illustrates a side view of an example aircraft (e.g., a rotorcraft) 100 in which examples disclosed herein may be implemented. FIG. 1B is a perspective view of a portion of a frame 101 of the aircraft 100. The example aircraft 100 of FIG. 1. includes multiple rotors (e.g., propellers) supported by the frame 101. In the example of FIGS. 1A and 1B, the aircraft 100 includes a first rotor 102, a second rotor 103, a third rotor 104, a fourth rotor 105, a fifth rotor 106, a sixth rotor 107, a seventh rotor 108, and an eighth rotor 109. In the example of FIGS. 1A and 1B, the first and second rotors 102, 103 are coaxial, the third and fourth rotors 104, 105 are coaxial, the fifth and sixth rotors 106, 107 are coaxial, and the seventh and eighth rotors 108, 109 are coaxial. The example aircraft 100 can include additional or fewer rotors. Also, the arrangement of the rotor(s) can differ from the example shown in FIGS. 1A and 1B. Although the aircraft 100 illustrated in FIGS. 1A and 1B is a multi-rotor aircraft, the examples disclosed herein can be implemented with other types of air vehicles including additional rotors or fewer rotors (e.g., a single rotor helicopter).

Figure 2:
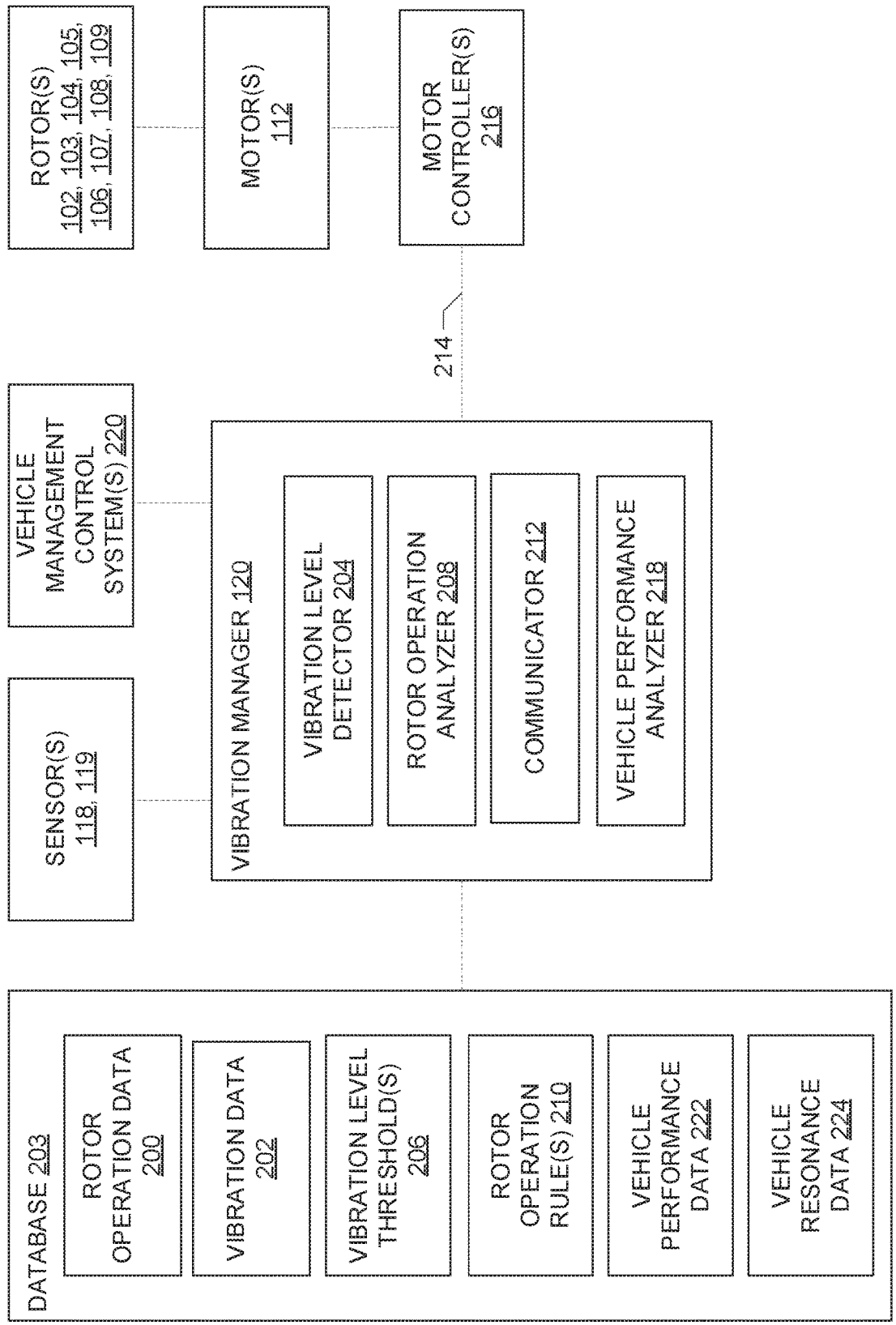
FIG. 2 is a block diagram of an example implementation of the vibration manager of FIG. 1A.

Each of the rotors 102, 103, 104, 105, 106, 107, 108, 109 includes one or more blades 110 that rotate about respective axes passing through the rotors 102, 103, 104, 105, 106, 107, 108, 109 during operation of the rotors 102, 103, 104, 105, 106, 107, 108, 109. The rotor(s) 102, 103, 104, 105, 106, 107, 108, 109 of the example aircraft 100 can include additional blades 110 than shown in FIGS. 1A and 1B. In the example of FIGS. 1A and 1B, operation of the rotors 102, 103, 104, 105, 106, 107, 108, 109 is controlled by one or more motors 112 operatively coupled to the rotors 102, 103, 104, 105, 106, 107, 108, 109. The motor(s) 112 control, for instance, a speed of rotation of the blades 110 (e.g., revolutions per minute (RPM)). The motor(s) 112 control the rotors 102, 103, 104, 105, 106, 107, 108, 109, respectively, based on instructions received from one or more motor controllers (FIG. 2).

The example aircraft 100 includes one or more first sensors 118 to collect data about operation of the rotors 102, 103, 104, 105, 106, 107, 108, 109 during flight of the aircraft 100 and/or while the aircraft 100 is on the ground but the rotors 102, 103, 104, 105, 106, 107, 108, 109 are active (e.g., prior to takeoff, at landing). The first sensor(s) 118 can include angular velocity sensor(s) and/or angular position sensor(s). The first sensor(s) 118 generate data about operational parameter(s) such as whether or not the rotor is in an active state, rotor speed, blade position, etc.

The example aircraft 100 includes one or more second sensors 119 to detect vibrations of the aircraft 100. The second sensor(s) 119 can include, for instance, accelerometers (e.g., 3-axes accelerometers), gyroscope(s)), and/or position sensors. The second sensor(s) 119 generate data that can be used to detect vibrations of the aircraft at the location of the second sensor(s) 119. The example aircraft 100 can include additional types of sensors and/or numbers of sensors than shown in FIGS. 1A and 1B.

In the example of FIGS. 1A and 1B, the first sensor(s) 118 and/or the second sensor(s) 119 can be coupled to the frame 101 and/or any of the rotors 102, 103, 104, 105, 106, 107, 108, 109. In some examples, the location of the second sensor(s) 119 is based on locations at which vibrations are expected to be experienced by the aircraft 100 and/or locations at which vibrations have been previously observed (e.g., based on prior sensor data and/or analytical modeling). For example, the second sensor(s) 119 can be coupled to the frame 101 proximate to the motor(s) 112 that control the rotors 102, 103, 104, 105, 106, 107, 108, 109 to record vibrations resulting from operation of the motor(s) 112. The example aircraft 100 can include additional sensors 118, 119 than shown in FIGS. 1A and 1B. Also, the sensors 118, 119 can be positioned at different locations than shown in FIGS. 1A and 1B.

In the example of FIGS. 1A and 1B, data generated by the sensor(s) 118, 119 is transmitted (e.g., via one or more wired or wireless connections) to a vibration manager 120. The vibration manager 120 can be implemented by one or more processors of the aircraft 100. The example vibration manager 120 analyzes the sensor data with respect to the vibrations experienced by the aircraft 100 at the locations of the aircraft 100 including the second sensors 119 (e.g., at the frame 101 proximate to the motor(s) 112 of the rotor(s) 102, 103, 104, 105, 106, 107, 108, 109). The example vibration manager 120 determines whether the vibrations experienced by the aircraft 100 during operation of the rotors 102, 103, 104, 105, 106, 107, 108, 109 are acceptable relative to particular, predefined threshold levels of vibration for the aircraft 100 and/or components thereof. If the example vibration manager 120 determines that the vibrations experienced by the aircraft 100 exceed the thresholds, the vibration manager 120 generates instruction(s) for the controller(s) of the motor(s) 112, 114 to adjust one or more operational parameters of the rotor(s) 106, 108 such as rotor speed and/or rotational phase between the rotors 106, 108. In adjusting the speed and/or phase of the rotor(s) 102, 103, 104, 105, 106, 107, 108, 109, the example vibration manager 120 causes changes to the vibration of the aircraft 100 at the sensor location(s) to reduce or suppress the vibrations.

For example, the vibration manager 120 analyzes accelerometer data generated by the second sensor(s) 119 and angular velocity data generated by the first sensor(s) 118 for the first rotor 106 to assess the vibrations experienced by the aircraft 100 at particular rotor speeds of the first rotor 106. If the example vibration manager 120 determines that the vibrations experienced by the aircraft 100 exceed a threshold, the vibration manager 120 generates instructions to adjust the speed (e.g., RPM) of the first rotor 102. The vibration manager 120 can generate instructions with respect to operation of one of the rotors 102, 103, 104, 105, 106, 107, 108, 109 and/or two or more of the rotors 102, 103, 104, 105, 106, 107, 108, 109. For example, the vibration manager 120 can generate instructions that cause the blades 110 of the first and second rotors 102, 103 to rotate in-phase or out-of-phase relative to one another with respect to positions of the blades. For instance, when a blade 110 of the first rotor 102 is at a first radial position, a blade 110 of the second rotor 103 can be at a corresponding radial position (in-phase) or a different radial position (out-of-phase) based on the respective speeds of the rotors 102, 103. In some examples, the vibration manager 120 adjusts the operational parameter(s) of the rotor(s) 102, 103, 104, 105, 106, 107, 108, 109 to cancel or mitigate vibrations experienced at the different location(s) of the aircraft 100.

After adjusting the operational parameter(s) of the rotor(s) 102, 103, 104, 105, 106, 107, 108, 109, the example vibration manager 120 continues to sample the sensor data generated by the second sensors 119 to evaluate the effect of the rotor adjustment(s) with respect to the vibrations experienced by the aircraft 100. For instance, the vibration manager 120 determines if the vibration data generated by the second sensors 119 (e.g., the accelerometers) after the rotor adjustment(s) satisfies the vibration level threshold. If the vibration manager 120 determines that the vibration level threshold is not satisfied, the vibration manager 120 determines adjustments and/or re-adjustments to the operational parameter(s) of the rotor(s) 102, 103, 104, 105, 106, 107, 108, 109 to reduce vibrations experienced by the aircraft 100 (e.g., readjusting the rotor speeds or rotor phases).

In some examples, the vibration manager 120 analyzes the impact of the adjustment(s) of the operational parameter(s) of the rotor(s) 102, 103, 104, 105, 106, 107, 108, 109 with respect to flight performance of the aircraft 100. For example, the vibration manager 120 analyzes the effect of changes to the speed of the rotor(s) on parameters such as thrust, endurance, range, etc. In some examples, the vibration manager 120 evaluates the changes to the operational parameter(s) of the rotor(s) 102, 103, 104, 105, 106, 107, 108, 109 in view of conditions such as aircraft payload, ceiling, etc. In some examples, the vibration manager 120 adjusts or readjusts the rotor operational parameter(s) based on the impact of the previous adjustment(s) on the performance. In some instances, the vibration manager 120 adjusts the behavior of the rotor(s) 102, 103, 104, 105, 106, 107, 108, 109 and/or refrains from implementing changes to the operation the rotor(s) 102, 103, 104, 105, 106, 107, 108, 109 if the changes would adversely affect performance of the aircraft 100. Thus, the vibration manager 120 balances suppression of vibrations due to the rotor(s) 102, 103, 104, 105, 106, 107, 108, 109 with aircraft performance to manage vibration levels without unduly affecting operation of the aircraft.

FIG. 2 is a block diagram of an example implementation of the vibration manager 120 of FIG. 1A. As mentioned above, the vibration manager 120 receives rotor operation data 200 from the first sensor(s) 118 (e.g., angular velocity sensor(s), angular position sensor(s)) during flight of the aircraft 100 and/or while the aircraft 100 is grounded. The rotor operation data 200 can include, for example, angular velocity data and/or angular position data (e.g., for the rotor blade(s) 110). The vibration manager 120 receives vibration data 202 from the second sensor(s) 119 (e.g., accelerometer(s), gyroscope(s), position sensor(s)) indicative of vibrations at location(s) of the aircraft 100 at which the second sensor(s) 119 are located.

The sensor data 200, 202 can be transmitted from the respective first and second sensor(s) 118, 119 to the vibration manager 120 substantially continuously or at predefined sampling intervals based on, for instance, sensor type and user setting(s) for the sensor(s) 118, 119 and/or the vibration manager 120. In some examples, the sensor data 200, 202 is sampled by the vibration manager 120 in substantially real time (e.g., within milliseconds of being collected by the sensor(s) 118, 119) to allow the vibration manager 120 to address vibrations currently being experienced by the aircraft 100. The sensor data 200, 202 is stored in a database 203. In some examples, the vibration manager 120 includes the database 203. In other examples, the database 203 is located external to the vibration manager 120 in a location accessible to the vibration manager 120 as shown in FIG. 2. The sensor data 200, 202 can be stored in the database 203 based on, for instance, the location at which the sensor data 200, 202 was generated, the proximity of the second sensor(s) 118, 119 relative to a particular rotor 102, 103, 104, 105, 106, 107, 108, 109, etc. The database 203 can store other types of sensor data received from the sensor(s) 118, 119.

The example vibration manager 120 of FIG. 2 includes a vibration level detector 204. The vibration level detector 204 analyzes the vibration data 202 to determine if the vibrations experienced by the aircraft 100 at one or more locations where the vibration data 202 was collected satisfies particular (e.g., predefined) vibration level threshold(s) 206 for the aircraft 100 at those location(s). The vibration level threshold(s) 206 can be based on reference data (e.g., test data, historical data) collected for the aircraft 100 or another vehicle, or derived from analytical models. In the example of FIG. 2, the vibration level threshold(s) 206 are stored in the database 203.

The vibration level threshold(s) 206 define acceptable vibration value(s), level(s), or range(s) (e.g., frequencies) for the aircraft 100 based on aircraft type, expected payload, fatigue and/or failure characteristics of one or more components of the aircraft 100, etc. The example vibration level detector 204 compares the vibration data 202 to the vibration level threshold(s) 206 to determine if the vibrations detected at the locations of the aircraft 100 including the second sensor(s) 119 exceed the vibration level threshold(s) 206. In some examples, the vibration level detector 204 monitors the vibration data 202 for a particular time period before determining whether the vibration data 202 exceeds the threshold(s) 206 to minimize instances of false positives.

The example vibration manager 120 of FIG. 2 includes a rotor operation analyzer 208. In some examples, the vibration level detector 204 determines that the vibration data 202 exceeds the vibration level threshold(s) 206 and, thus, the aircraft 100 is experiencing excessive vibrations. In such examples, the rotor operation analyzer 208 analyzes the rotor operation data 200 for the rotor(s) 106, 108 to identify the operational parameter(s) of the rotor(s) 102, 103, 104, 105, 106, 107, 108, 109 that contributed to the excessive vibrations. For example, the rotor operation analyzer 208 analyzes the rotor operation data 200 including RPM data and/or rotor phase position data that is time-aligned with the vibration data 202 indicative of excessive vibrations generated at the particular aircraft location(s).

In the example of FIG. 2, the rotor operation analyzer 208 determines one or more adjustments to be made to the operational parameters of the rotor(s) 102, 103, 104, 105, 106, 107, 108, 109 to suppress the vibrations. The rotor operational parameter adjustment(s) can include changes to the rotor speed (e.g., increasing or decreasing RPM) for one or more of the rotors 102, 103, 104, 105, 106, 107, 108, 109. In some examples, the rotor operation analyzer 208 determines that the speed of one or more of the rotors 102, 103, 104, 105, 106, 107, 108, 109 should be adjusted to synchronize or desynchronize the rotational phase of the respective blades 110 of two or more of the rotors 102, 103, 104, 105, 106, 107, 108, 109. For example, the rotor operation analyzer 208 can determine that the blades 110 of the first and second rotors 102, 103 should rotate in-phase, such that when a blade 110 of the first rotor 102 is at a particular radial position relative to an axis of the first rotor 102, a blade 110 of the second rotor 103 is at a corresponding radial position relative to the corresponding axis of the second rotor 103. As another example, the rotor operation analyzer 208 can determine that the blades 110 of the first and third rotors 102, 104 should rotate out-of-phase, such that when a blade 110 of the first rotor 102 is at a particular radial position relative to an axis of the first rotor 106, a blade 110 of the third rotor 104 is at a different radial position relative to a corresponding axis of the third rotor 104.

In the example of FIG. 2, the rotor operation analyzer 208 determines the adjustment(s) to the rotor operational parameter(s) based on the vibration data 202 and one or more rotor operation rules 210. The rotor operation rule(s) 210 define values and/or settings for the rotor operational parameter(s) (e.g., speed, phase) based on the vibration data 200 and characteristics of the rotors such as a number of blades to suppress the vibrations. For instance, the rotor operation rule(s) 210 can define an amount by which the RPM for each rotor 106, 108 should be increased or decreased based on values of the vibration data 202 and/or an amount by which the vibration data 202 exceeds the vibration level threshold(s) 206. The rotor operation rule(s) 210 can define whether operational parameter(s) for one or more of the rotors 102, 103, 104, 105, 106, 107, 108, 109 should be adjusted based on, for instance, the location(s) at which the vibrations were detected and/or the known vibration mode(s) at those location(s) (e.g. resonant frequency). In some examples, the rotor operation rule(s) 210 are based on characteristics of the rotors such as a number of blades, which can affect rotational phase of the rotors and cancellation of the vibrations of the vehicle frame resulting from adjustments to the rotational phase. The rotor operation rule(s) 210 can be based on, for instance, user inputs, test data, historical data, analytical models, etc. In the example of FIG. 2, the rotor operation rule(s) 210 are stored in the database 203.

The example vibration manager 120 of FIG. 2 includes a communicator 212. The communicator 212 generates instruction(s) 214 based on the adjustment(s) to the operational parameter(s) determined by the rotor operation analyzer 208. The communicator 212 transmits the instruction(s) 214 to one or more motor controllers 216 associated with the motor(s) 114, 116 of the respective rotor(s) 102, 103, 104, 105, 106, 107, 108, 109. Based on the instruction(s) 214, the motor controller(s) 216 implement the adjustment(s) to the operational parameter(s) of the rotor(s) 102, 103, 104, 105, 106, 107, 108, 109 (e.g., changes in the speed at which the rotor(s) 102, 103, 104, 105, 106, 107, 108, 109 rotate) to suppress the vibrations. In some examples, the communicator 212 transmits data related to rotor operations to the ground and/or to other vehicles.

The first and second sensors 118, 119 continue to generate the sensor data 200, 202 after the adjustment(s) to the operational parameter(s) of the rotor(s) 102, 103, 104, 105, 106, 107, 108, 109. The vibration level detector 204 of the example vibration manager 120 accesses the vibration data 202 generated by the second sensor(s) 119 after the adjustment(s) to the rotor operational parameter(s) at predefined sampling intervals (e.g., every millisecond). The vibration level detector 204 identifies changes in the vibration data 202 as a result of the changes to the rotor behavior. In the example of FIG. 2, if the vibration level detector 204 determines that the vibration data 202 exceeds the vibration level threshold(s) 206 after the adjustment(s) to the rotor operational parameter(s), the rotor operation analyzer 208 adjusts or readjusts the speed and/or phase of the rotor(s) 102, 103, 104, 105, 106, 107, 108, 109 to suppress the vibrations. Thus, the example vibration manager 120 uses the vibration data 202 as feedback to further refine the adjustment(s) to the operational parameter(s) of the rotor(s) 102, 103, 104, 105, 106, 107, 108, 109.

In the example of FIG. 2, the vibration manager 120 is in communication with one or more vehicle management control systems 220. The vehicle management control system(s) 220 can include sensor(s), processor(s), etc. that are used to monitor and/or control one or more components of the aircraft 100, such as the engine(s), the rotor(s) 102, 103, 104, 105, 106, 107, 108, 109, wing flaps(s), etc. In the example of FIG. 2, the vibration manager 120 accesses vehicle performance data 222 from the vehicle management control system(s) 220. The vehicle performance data 222 includes parameters for the aircraft 100 such as flight mode (e.g., take-off, cruising, hovering), endurance, range, ceiling, lift, thrust, payload, etc. based on the current operation of the aircraft 100 as monitored by the vehicle management control system(s) 220. In some examples, some of the vehicle performance data is based on user input(s).

The example vibration manager 120 of FIG. 2 includes a vehicle performance analyzer 218. In the example of FIG. 2, the vehicle performance analyzer 218 analyzes the vehicle performance data 222 to determine the effects of the adjustment(s) to the rotor operational parameter(s) on performance of the aircraft 100. In particular, the vehicle performance analyzer 218 assesses with the adjustment(s) to the operational parameter(s) of the rotor(s) 102, 103, 104, 105, 106, 107, 108, 109 have adversely affected performance of the aircraft 100. For instance, the vehicle performance analyzer 218 determines whether changes to the rotational speed of the rotors 102, 103, 104, 105, 106, 107, 108, 109 have resulted in insufficient thrust forces generated by the rotor(s) 102, 103, 104, 105, 106, 107, 108, 109 for the flight conditions of the aircraft 100.

If the vehicle performance analyzer 218 determines, based on the vehicle performance data that the changes to the rotor operational parameter(s) adversely affected the flight performance, the rotor operation analyzer 208 adjusts and/or readjusts the operational parameter(s) of the rotor(s) 102, 103, 104, 105, 106, 107, 108, 109. For example, if decreasing the RPM of the first rotor 102 adversely affected the amount of thrust generated by the aircraft 100, then the rotor operation analyzer 208 may determine that the RPM of the first rotor 102 should be re-adjusted (e.g., increased relative to the initial adjusted amount), despite a potential increase in vibrations experienced by the aircraft 100. Thus, the example vibration manager 120 performs an optimization with respect to vehicle performance and suppression of the vibrations experienced by the aircraft 100 due to operation of the rotors 102, 103, 104, 105, 106, 107, 108, 109.

In some examples, as part of optimizing flight performance with vibration suppression, the rotor operation analyzer 208 evaluates how the operational parameter adjustments are applied to the respective rotors 102, 103, 104, 105, 106, 107, 108, 109. As an example, the rotor operation analyzer 208 may determine that each rotor 102, 103, 104, 105, 106, 107, 108, 109 should rotate with an angular velocity of 628 rad/s to reduce vibrations. In such examples, the motor controller(s) 216 cause the first and third rotors 102, 104 to rotate at 628 rad/s. However, after analyzing the vibration data 202 and/or the vehicle performance data 222 generated after the adjustment of the rotational speed of the first and third rotors 102, 104 to 628 rad/s, the rotor operation analyzer 208 may determine that rotation of each rotor 102, 104 at 628 rad/s causes one or more locations of the aircraft 100 to vibrate at resonant frequency. In such examples, the rotor operation analyzer 208 determines that the rotational speed for each rotor 102, 104 should be adjusted such that the first rotor 102 rotates at 596 rad/s and the third rotor 104 rotates at 659 rad/s. Thus, the rotor operation analyzer 208 evaluates the manner in which the adjustments to the operational parameters are applied to the rotor(s) 102, 103, 104, 105, 106, 107, 108, 109 as part of the optimization of vehicle performance and vibration suppression.

In the examples disclosed above, the vibration manager 120 of FIG. 2 actively controls the rotor(s) 106, 108 based on the vibration sensor data 202 generated by the second sensor(s) 119 at particular location(s) of the aircraft 100 and transmitted to the vibration manager 120 in substantially real time (e.g., within milliseconds of being collected). In some other examples, the vibration manager 120 generates the instruction(s) 214 to control the operational parameter(s) of the rotor(s) 102, 103, 104, 105, 106, 107, 108, 109 based on the vehicle performance data 222 indicative of an operational state of the aircraft 100 (e.g., cruising, take-off, hovering) and known vehicle frame resonance data 224. The known vehicle frame resonance data 224 includes resonance modes for one or more portions of the frame 101 (FIGS. 1A, 1B) of the aircraft 100 associated with different vehicle operational states based on test data, historical data, analytical models, etc. for the aircraft 100 or another vehicle. In some examples, the known vehicle frame resonance data 224 is based on characteristics of the rotors such as blade number. In such examples, the rotor operation analyzer 208 of the vibration manager 120 determines, for instance, whether two or more of the rotors 102, 103, 104, 105, 106, 107, 108, 109 should rotate in-phase or out-of-phase during cruising to avoid causing the aircraft 100 to vibrate at the known resonant frequencies based on the rotor operation rule(s) 210.

In some other examples, the vibration manager 120 uses the rotor operation data 200 and the vehicle resonance data 224 to control the rotor(s) 102, 103, 104, 105, 106, 107, 108, 109 as the rotor(s) 102, 103, 104, 105, 106, 107, 108, 109 rotate at speeds associated with known resonant frequencies of the aircraft 100. For instance, based on the rotor operation data 200 indicative of rotational speeds for the rotor(s) 102, 103, 104, 105, 106, 107, 108, 109 associated with known resonant vibration frequencies of the aircraft 100, the rotor operation analyzer 208 instructs (e.g., via the instruction(s) 214) the motor controller(s) 216 to cause two or more of the rotors 102, 103, 104, 105, 106, 107, 108, 109 to rotate out-of-phase with one another to prevent the aircraft 100 from vibrating at the known resonant frequencies as the rotor(s) operate at particular speeds. Thus, the example vibration manager 120 can manage the operational parameter(s) of the rotor(s) to suppress vibrations based on different data inputs.

While an example manner of implementing the vibration manager 120 of FIG. 1A is illustrated in FIG. 2, one or more of the elements, processes and/or devices illustrated in FIG. 2 may be combined, divided, re-arranged, omitted, eliminated and/or implemented in any other way. Further, the example database 203, the example vibration level detector 204, the rotor operation analyzer 208, the example communicator 212, the example vehicle performance analyzer 218 and/or, more generally, the example vibration manager 120 of FIG. 2 may be implemented by hardware, software, firmware and/or any combination of hardware, software and/or firmware. Thus, for example, any of the example database 203, the example vibration level detector 204, the rotor operation analyzer 208, the example communicator 212, the example vehicle performance analyzer 218 and/or, more generally, the example vibration manager 120 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 203, the example vibration level detector 204, the rotor operation analyzer 208, the example communicator 212, and/or the example vehicle performance analyzer 218 is/are hereby expressly defined to include a non-transitory computer readable storage device or storage disk such as a memory, a digital versatile disk (DVD), a compact disk (CD), a Blu-ray disk, etc. including the software and/or firmware. Further still, the example vibration manager 120 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
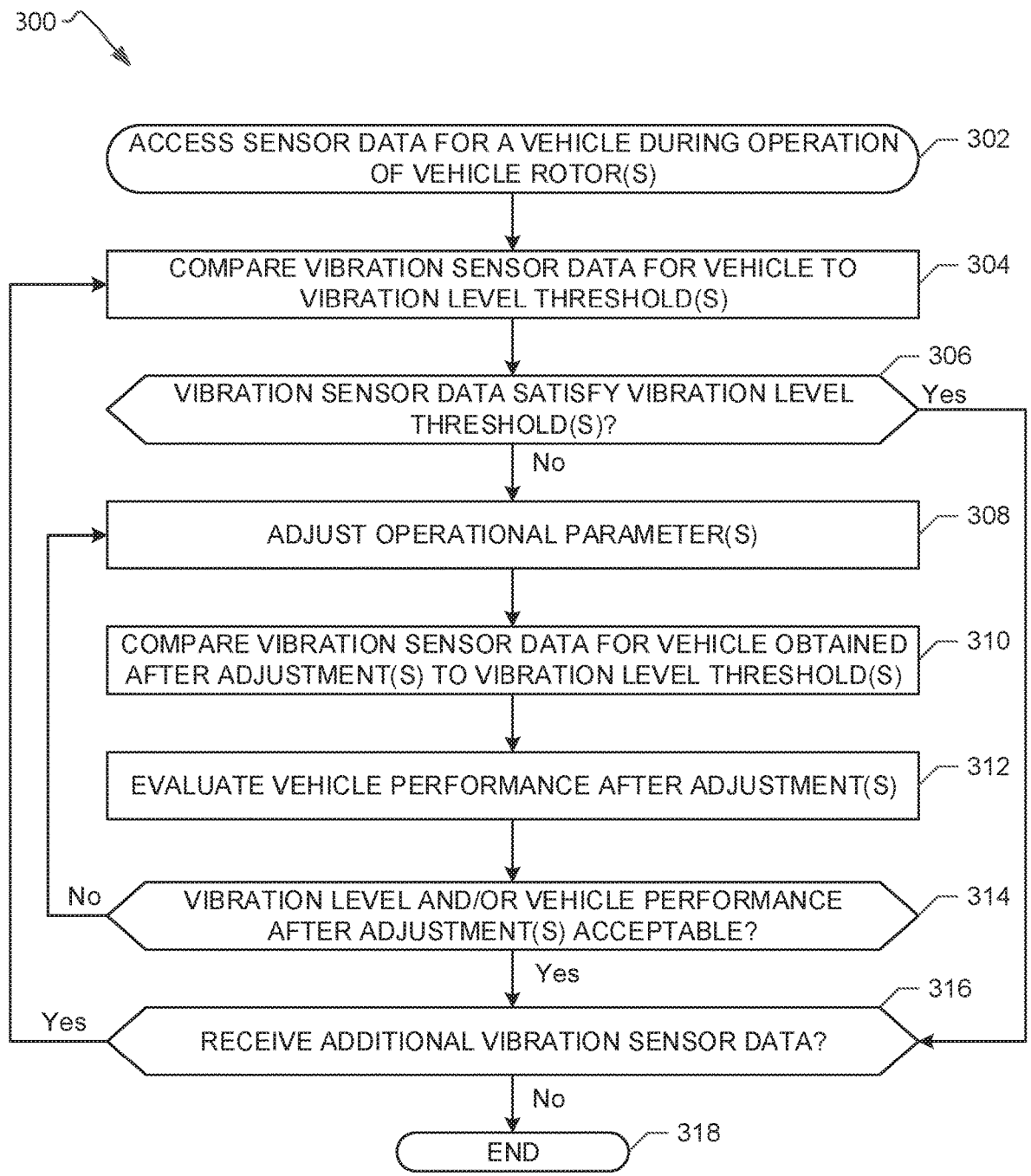
FIG. 3 is a flowchart representative of machine readable instructions which may be executed to implement the example vibration manager of FIG. 2 based on data generated by the sensors of FIG. 1A.
Figure 4:
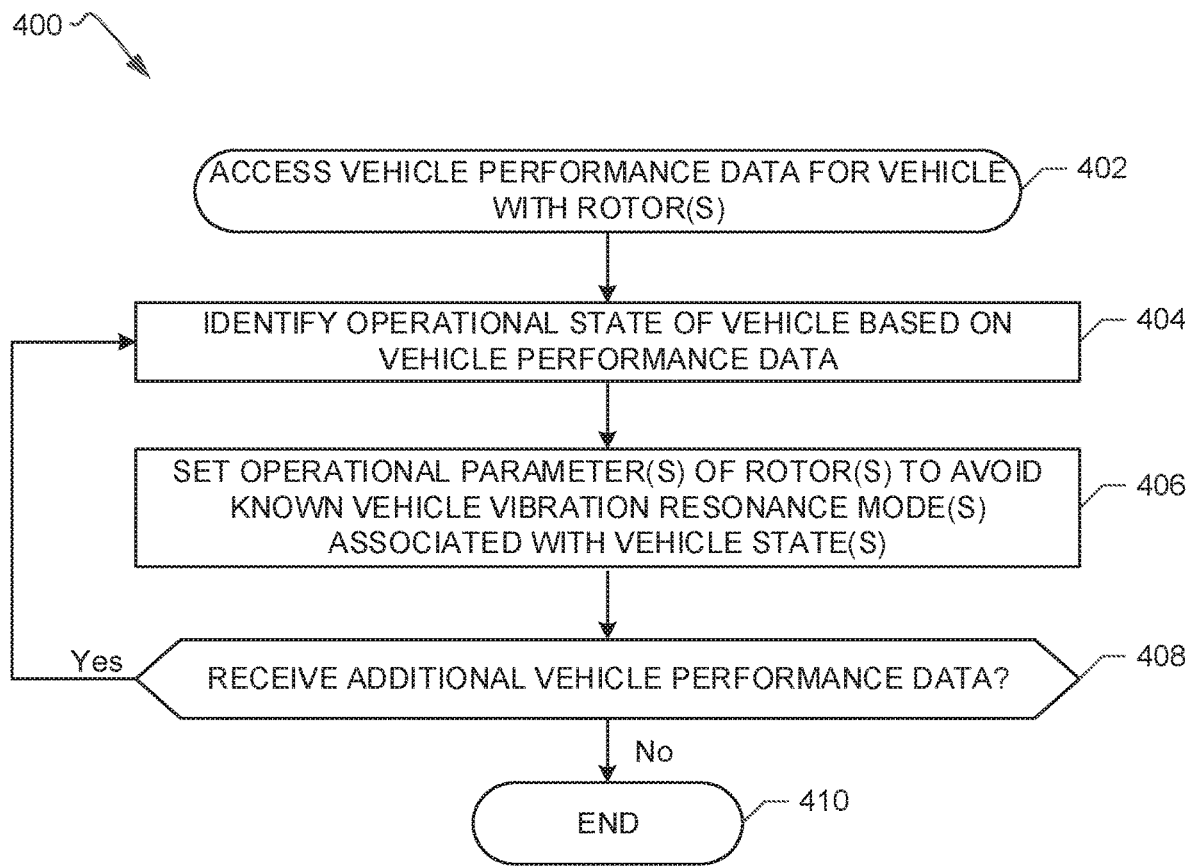
FIG. 4 is a flowchart representative of machine readable instructions which may be executed to implement the example vibration manager of FIG. 2 based on an operative state of the vehicle.
Figure 5:
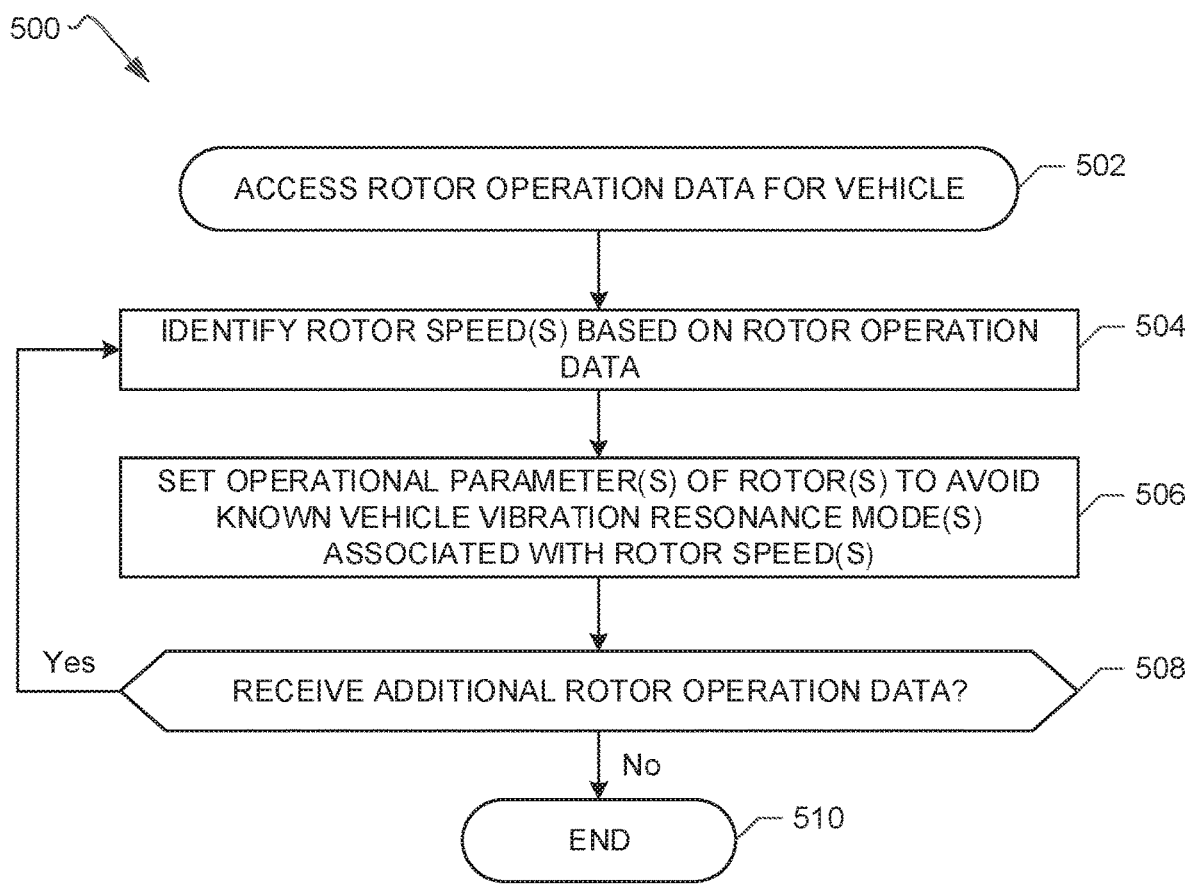
FIG. 5 is a flowchart representative of machine readable instructions which may be executed to implement the example vibration manager of FIG. 2 based on a speed of the rotor(s) of the vehicle.

Flowcharts representative of example hardware logic, machine readable instructions, hardware implemented state machines, and/or any combination thereof that may be used to implement the example vibration manager 120 of FIGS. 1 and 2 are shown in FIG. 3-5. The machine readable instructions may be an executable program or portion of an executable program for execution by a computer processor such as the processor 612 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 3-5, many other methods of implementing the example vibration manager 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 3 is a flowchart of an example method 300 to control vibrations experienced by a vehicle including one or more rotors (e.g., the aircraft 100 of FIGS. 1A and 1B including the rotors 102, 103, 104, 105, 106, 107, 108, 109) at one or more locations on a frame of the vehicle (e.g., on the frame 101 of the aircraft 100) based on vibration data collected by one or more sensors coupled to the frame. The example method 300 of FIG. 3 can be implemented by the example vibration manager 120 of FIGS. 1A and 2.

The example method 300 begins with accessing sensor data collected at different locations of a vehicle such as an aircraft generated during operation of the rotor(s) of the vehicle (block 302). For example, the vibration manager 120 receives the rotor operation data 200 from the first sensor(s) 118 (e.g., angular velocity sensor(s), angular position sensor(s)) indicative of operational parameter(s) (e.g., speed) of the rotor(s) 102, 103, 104, 105, 106, 107, 108, 109. The vibration manager 120 receives vibration data 202 from the second sensor(s) 119 (e.g., accelerometer(s), gyroscope(s)) indicative of vibrations experienced by the aircraft 100 at the locations on the frame 101 including the second sensor(s) 119. The sensor data 200, 202 is stored in the database 203. The vibration manager 120 can access the sensor data at predefined sampling intervals (e.g., every millisecond).

The example method 300 includes comparing vibration sensor data for the vehicle to vibration level threshold(s) and determining if the vibration sensor data satisfies the vibration level threshold(s) (blocks 304, 306). For example, the vibration level detector 204 of FIG. 2 compares the vibration data 202 to the vibration level threshold(s) 206 stored in the database 203. The vibration level threshold(s) 206 define acceptable vibration value(s) or range(s) (e.g., frequencies) based on aircraft type, expected payload, fatigue and/or failure characteristics of one or more components of the aircraft 100, etc. The vibration level detector 204 of FIG. 2 determines whether the vibration data satisfies the threshold(s) 206 based on whether the data exceeds the threshold(s) 206 by a certain amount, falls below the threshold(s) 206, etc.

In the example of FIG. 3, if the vibration sensor data does not satisfy the threshold(s) (e.g., the vibration sensor data exceeds the threshold(s)), the example method 300 includes adjusting one or more operational parameter(s) of the rotor(s) (block 308). For instance, the rotor operation analyzer 208 determines the adjustment(s) the operational parameter(s) of the rotor(s) 102, 103, 104, 105, 106, 107, 108, 109 based on the rotor operation data 200 received from the first sensor(s) 118, the analysis of the vibration sensor data 202 by the vibration level detector 204, and the rotor operation rule(s) 210. The rotor operation analyzer 208 can implement the adjustment(s) by adjusting rotational speed of one or more rotors, adjusting rotational phase of one or more rotors, or by adjusting both rotational speed and rotational phase for one or more rotors. As an example, the rotor operation analyzer 208 can adjust the speed (e.g., RPM) of the one or more of the rotors 102, 103, 104, 105, 106, 107, 108, 109. In some examples, the rotor operation analyzer 208 modifies the speed of the rotor(s) 102, 103, 104, 105, 106, 107, 108, 109 to adjust the rotational positions of the blades of two or more of the rotors 102, 103, 104, 105, 106, 107, 108, 109 to cause the rotors to rotate in-phase or out-of-phase relative to one another. The communicator 212 of the example vibration manager 120 transmits instruction(s) 214 including the adjustment(s) to the operational parameter(s) to the motor controller(s) 216 of the rotor(s) 102, 103, 104, 105, 106, 107, 108, 109.

The example method 300 of FIG. 3 includes comparing vibration sensor data for the aircraft generated after the adjustment(s) to the operational parameter(s) of the rotor(s) to the vibration level threshold(s) (block 310). For example, the vibration level detector 204 compares the vibration sensor data generated after the adjustment(s) to the rotor operational parameter(s) to determine if the adjustment(s) have reduced the vibration levels below the threshold(s) 206.

The example method 300 of FIG. 3 includes evaluating a performance of the vehicle after the adjustment(s) to the operational parameter(s) of the rotor(s) (block 312). For example, the vehicle performance analyzer 218 analyzes vehicle performance data 222 generated by the vehicle management control system(s) 220 after the adjustment(s) to the rotor operational parameter(s) with respect to parameters such as thrust, lift, range, endurance, etc. In particular, the vehicle performance analyzer 218 determines if the vehicle performance data 222 indicates that the performance of the aircraft 100 has been adversely affected by the changes to the rotor operational parameter(s). For example, the vehicle performance analyzer 218 identifies, based on the vehicle performance data 222, if the endurance of the aircraft 100 has decreased in view of an adjustment to the rotational speed(s) of the rotor(s) 102, 103, 104, 105, 106, 107, 108, 109.

In the example of FIG. 3, if the vibration level and/or the performance of the vehicle is not acceptable after the adjustment(s) to the rotor operational parameter(s) (block 314), the example method 300 returns to adjusting (i.e., re-adjusting) the operational parameter(s) of the rotor(s) and evaluating the adjustment(s) (blocks 308-314). For example, the rotor operation analyzer 208 can adjust the synchronization of the rotation of two or more of the rotors 102, 103, 104, 105, 106, 107, 108, 109 to further reduce vibrations of the aircraft 100.

The example method 300 of FIG. 3 continues to analyze the vibration sensor data, determine if adjustment(s) to the rotor operational parameter(s) are needed to suppress vibrations of the vehicle, and evaluate the adjustment(s) with respect to vibration levels and/or vehicle performance until no further vibration sensor data is received (block 316). In some examples, the method 300 of FIG. 3 analyzes vibration sensor data, determines whether the vibration level thresholds are satisfied, and adjust (or refrains from adjusting) the rotor operational parameter(s) as long as the vehicle is in operating (e.g., the method 300 is performed continuously or substantially continuously during operation of the vehicle). When there is no further vibration sensor data for analysis (e.g., as when the vehicle is no longer operating), the example method 300 of FIG. 3 ends (block 318).

FIG. 4 is a flowchart of an example method 400 to control vibrations experienced by a vehicle including one or more rotors (e.g., the aircraft 100 of FIGS. 1A and 1B including the rotors 102, 103, 104, 105, 106, 107, 108, 109) at one or more locations on a frame of the vehicle (e.g., on the frame 101 of the aircraft 100) based on an operational state of the vehicle. The example method 400 of FIG. 4 can be implemented by the example vibration manager 120 of FIGS. 1A and 2.

The example method 400 of FIG. 4 begins with accessing vehicle performance data for a vehicle including one or more rotors (block 402). For example, the vibration manager 120 receives the vehicle performance data 222 from the vehicle management control system(s) 220 of the aircraft 100. The example method 400 of FIG. 4 includes identifying an operational state of the vehicle based on the vehicle performance data (block 404). For example, the rotor operation analyzer 208 of the vibration manager 120 determines whether aircraft 100 is taking off, cruising, hovering, etc. based on the vehicle performance data 222.

The example method 400 of FIG. 4 includes setting the operational parameter(s) of the rotor(s) to avoid known vehicle vibration resonance modes associated with the operational states of the vehicle (block 406). For example, the rotor operation analyzer 208 determines the adjustment(s) to the speed and/or phase synchronization of the rotor(s) 102, 103, 104, 105, 106, 107, 108, 109 based on the known vehicle resonance data 224 and the rotor operation rule(s) 210 to prevent the aircraft 100 from vibrating at the known resonant frequencies. The communicator 212 of the example vibration manager 120 transmits instruction(s) 214 including the operational parameter setting(s) to the motor controller(s) 216 of the rotor(s) 106, 108. The example method 400 of FIG. 4 ends when no further vehicle performance data is received (e.g., when the vehicle is no longer operating) (blocks 408, 410).

FIG. 5 is a flowchart of an example method 500 to control vibrations experienced by a vehicle (e.g., the aircraft 100 of FIGS. 1A and 1B including the rotors 102, 103, 104, 105, 106, 107, 108, 109) at one or more locations on a frame of the vehicle (e.g., on the frame 101 of the aircraft 100) based on speed(s) of the rotor(s) of the vehicle. The example method 500 of FIG. 5 can be implemented by the example vibration manager 120 of FIGS. 1A and 2.

The example method 500 of FIG. 5 begins with accessing rotor operation data for a vehicle including one or more rotors (block 502). For example, the vibration manager 120 receives the rotor operation data 200 from the first sensor(s) of the aircraft 100 (e.g., the angular velocity sensor(s)). The example method 500 of FIG. 5 includes identifying the speed(s) of the rotor(s) based on the rotor operation data (block 504). For example, the rotor operation analyzer 208 of the vibration manager 120 determines the speed at which the rotor(s) 102, 103, 104, 105, 106, 107, 108, 109 are rotating based on the rotor operation data 200.

The example method 500 of FIG. 5 includes setting the operational parameter(s) of the rotor(s) to avoid known vehicle vibration resonance modes associated with the speed at which the rotor(s) are operating (block 506). For example, the rotor operation analyzer 208 determines the adjustment(s) to the phase synchronization of the rotor(s) 102, 103, 104, 105, 106, 107, 108, 109 based on the rotor operation data 200, the known vehicle resonance data 224 and the rotor operation rule(s) 210 to prevent the aircraft 100 from vibrating at the known resonant frequencies as the rotor(s) operate at particular speeds. The communicator 212 of the example vibration manager 120 transmits instruction(s) 214 including the operational parameter setting(s) to the motor controller(s) 216 of the rotor(s) 102, 103, 104, 105, 106, 107, 108, 109. The example method 500 of FIG. 5 ends when no further rotor operation data is received (e.g., when the vehicle is no longer operating) (blocks 508, 510).

Figure 6:
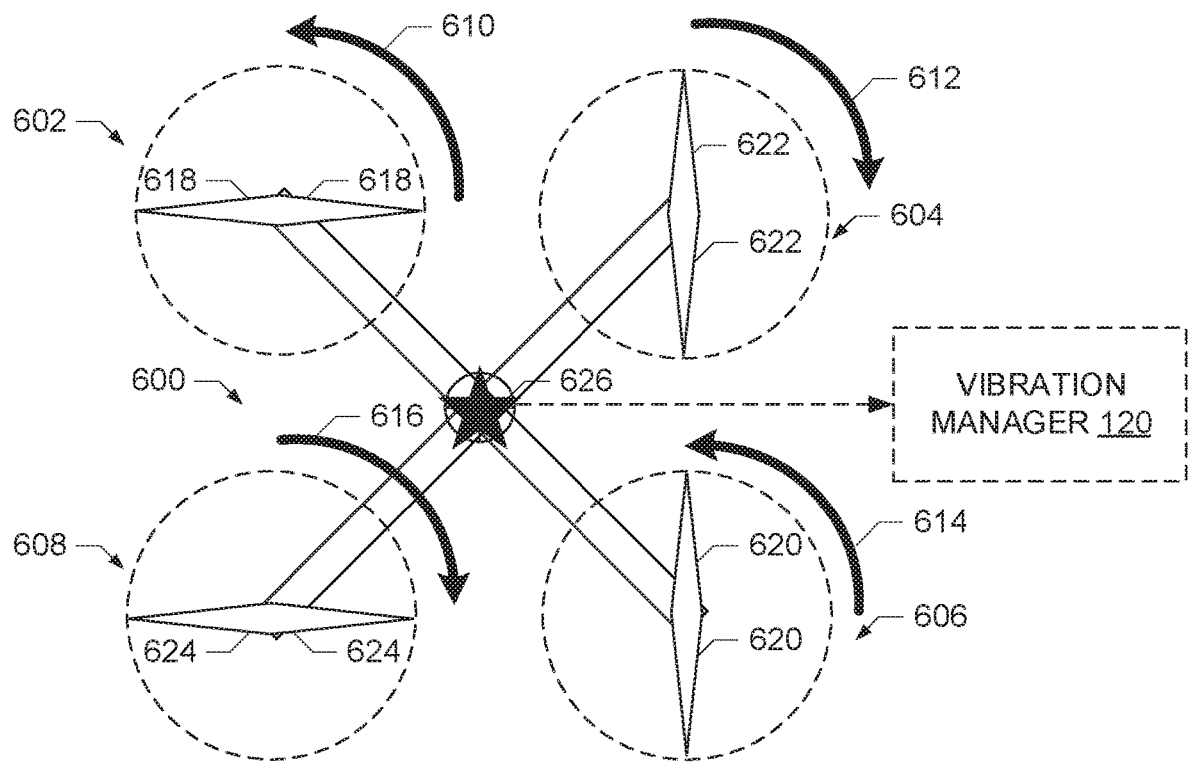
FIG. 6 is a schematic view of an example frame of a multi-rotor aircraft.

FIG. 6 is a schematic view of an example frame 600 of an aircraft (e.g., the aircraft 100 of FIGS. 1A and 1B) including a first rotor 602, a second rotor 604, a third rotor 606, and fourth rotor 608. A direction in which the rotors 602, 604, 606, 608 rotate is represented by respective arrows 610, 612, 614, 616 of FIG. 6. In the example of FIG. 6, the vibration manager 120 of FIGS. 1A and 2 causes blades 618 of the first rotor 602 to rotate out of phase with respect to blades 620 of the third rotor 606 (e.g., by sending instructions to the motor(s) 112 and the motor controller(s) 216 associated with the rotors 602, 604, 606, 608). Similarly, the vibration manager 120 causes blades 622 of the second rotor 604 to rotate out of phase with respect to blades 624 of the fourth rotor 608. In the example of FIG. 6, the vibration manager 120 instructs the rotors 602, 604, 606, 608 to rotate at the same rotational speed (RPM). The example frame 600 includes a sensor 626 coupled to the frame 600 to monitor vibrations of the frame 600 during operation of the rotors 602, 604, 606, 608.

Figure 7:
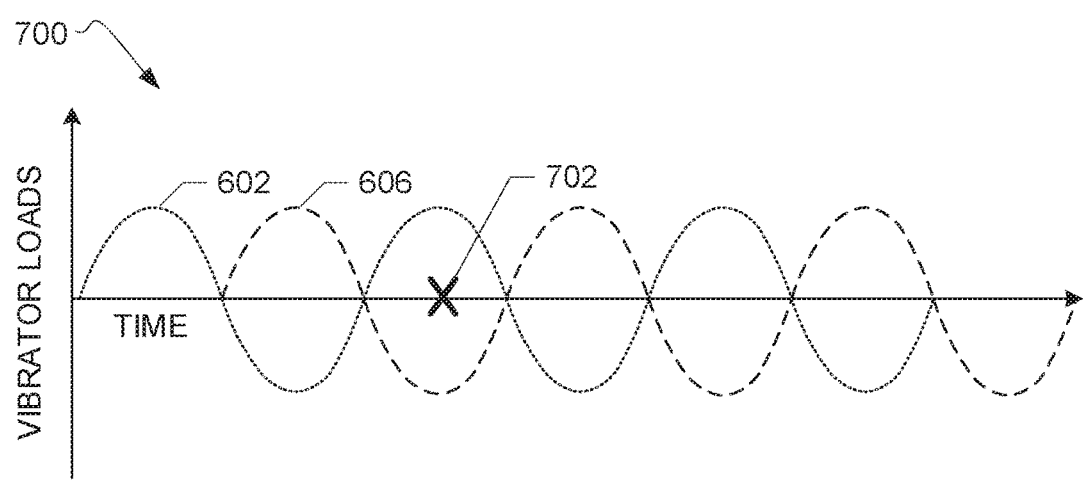
FIG. 7 is a graph illustrating cancellation of vibration modes of the frame of FIG. 6 by the example vibration manager of FIGS. 1A and 2 in accordance with teachings of this disclosure.

FIG. 7 is a graph 700 showing the cancellation of vibration of the frame 600 of FIG. 6 as a result of the respective blades 618, 620 of the first and third rotors 602, 606 of FIG. 6 rotating out of phase. For example, point 702 in the graph 700 represents the cancellation of vibrations that would have been experienced by the frame 600 at locations such as the location corresponding to the location of the sensor 626 in FIG. 6.

Figure 8:
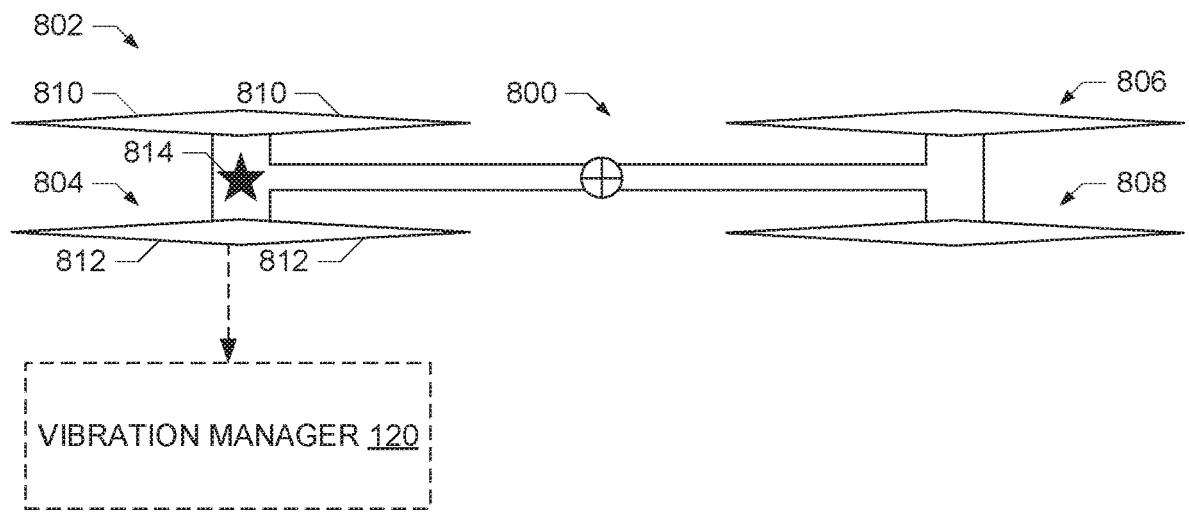
FIG. 8 is another schematic view of an example frame of a multi-rotor aircraft.

FIG. 8 is a schematic view of an example frame 800 of an aircraft (e.g., the aircraft 100 of FIGS. 1A and 1B) including a first rotor 802, a second rotor 804, a third rotor 806, and fourth rotor 808. In the example of FIG. 8, the first rotor 802 and the second rotor 804 are coaxial and the third rotor 806 and the fourth rotor 808 are coaxial. In the example of FIG. 8, the vibration manager 120 of FIGS. 1A and 2 causes blades 810 of the first rotor 802 to rotate out of phase with respect to blades 812 of the second rotor 804 (e.g., by sending instructions to the motor(s) 112 and the motor controller(s) 216 associated with the rotors 602, 604, 606, 608). In the example of FIG. 8, the vibration manager 120 instructs the rotors 802, 804 to rotate at the same rotational speed (RPM). The example frame 800 includes a sensor 814 coupled to the frame 800 to monitor vibrations of the frame 800 during operation of the rotors 802, 804.

Figure 9:
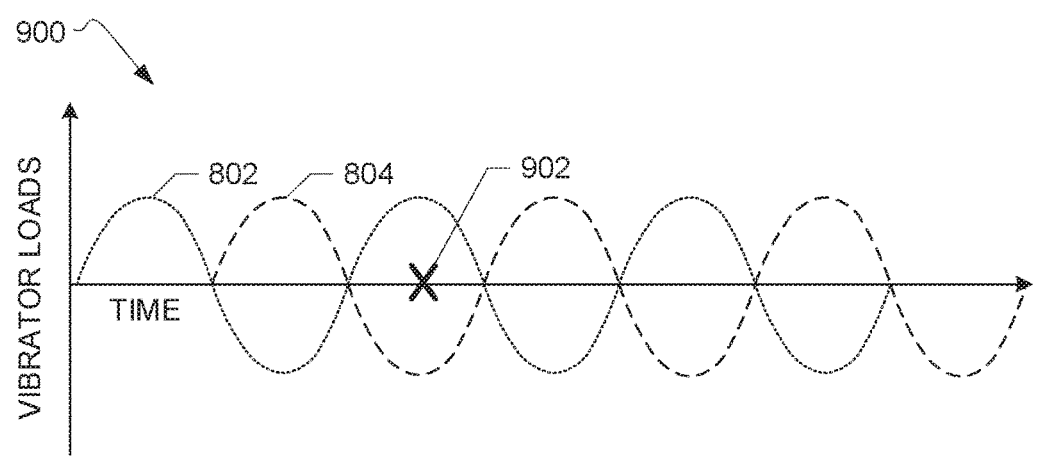
FIG. 9 is a graph illustrating cancellation of vibration modes of the frame of FIG. 8 by the example vibration manager of FIGS. 1A and 2 in accordance with teachings of this disclosure.

FIG. 9 is a graph 900 showing the cancellation of vibrations of the frame 800 of FIG. 8 as a result of the respective blades 810, 812 of the first and third rotors 802, 804 of FIG. 8 rotating out of phase. For example, point 902 in the graph 900 represents the cancellation of vibrations that would have been experienced by the frame 800 at locations such as the location corresponding to the location of the sensor 814 in FIG. 8.

Thus, by controlling the operational parameter(s) of the rotor(s) 602, 604, 606, 608, 802, 804, 806, 808 of FIGS. 6 and 8, the example vibration manager 120 of FIGS. 1A and 2 prevents or substantially reduces vibrations experienced by the vehicle frame. Although the examples of FIGS. 6-9 are discussed in connection with adjustments to the rotational phases of the rotors, in some examples, the vibration manager 120 can additionally or alternatively adjust the rotational speeds of one or more of the rotors.

Figure 10:
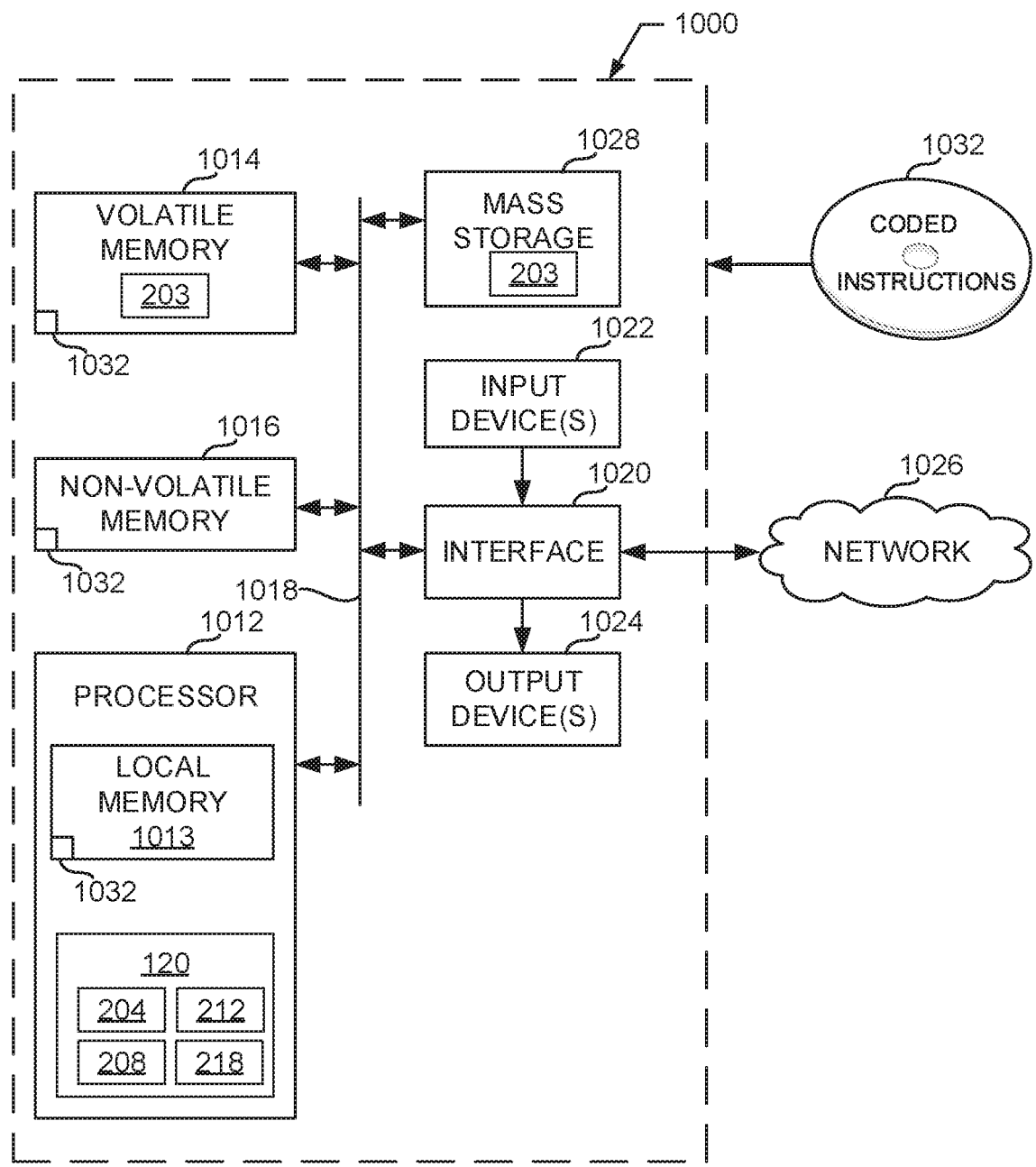
FIG. 10 is a block diagram of an example processing platform structured to execute the instructions of FIG. 3, FIG. 4, and/or FIG. 5 to implement the vibration manager of FIG. 2.

FIG. 10 is a block diagram of an example processor platform 1000 capable of executing instructions to implement the methods of FIGS. 3, 4 and/or 5 and/or to implement the vibration manager 120 of FIGS. 1 and 2. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example vibration level detector 204, the example rotor operation analyzer 208, the example communicator 212, and the example vehicle performance analyzer 218.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

Coded instructions 1032 of FIG. 10 may be stored in the mass storage device 1028, in the volatile memory 1014, in the non-volatile memory 1016, and/or on a removable non-transitory computer readable storage medium such as a CD or DVD.

From the foregoing, it will be appreciated that example apparatus, methods, and systems have been disclosed that adjust operational parameter(s) (e.g., speed) of one or more rotors of a vehicle such as an aircraft to suppress vibrations of the aircraft frame that arise during operation of the rotor(s). Some examples disclosed herein respond to vibrations detected by sensors coupled to aircraft during operation of the aircraft by dynamically adjusting the operational parameter(s) of the rotor(s) to suppress the vibrations. Some other examples disclosed herein adjust the operational parameter(s) of the rotor(s) based on an operational state of the vehicle and/or rotational speed of the rotor(s) to avoid known resonance vibration modes generated during operation of the rotor(s). Some examples disclosed herein optimize operation of the rotor(s) with performance of the vehicle to suppress vibrations without adversely affecting the performance of vehicle.

An example apparatus disclosed herein includes a vibration level detector to determine a vibration level of a frame of a vehicle based on data received from a sensor of the vehicle. The vehicle includes a rotor. The example apparatus includes a rotor operation analyzer to determine an operational parameter of the rotor based on the vibration level and a communicator to transmit an instruction including the operational parameter to a controller of the rotor.

In some examples, the vibration level detector is to determine the vibration level by performing a comparison of the data received from the sensor to a vibration level threshold.

In some examples, the operation parameter includes a rotational speed of the rotor.

In some examples, the operational parameter is a rotational phase.

In some examples, the apparatus further includes a vehicle performance analyzer to analyze vehicle performance data. In such examples, the rotor operation analyzer is to determine the operational parameter based on the vehicle performance data.

In some such examples, the rotor operation analyzer is to determine an adjustment to the operational parameter based on the vehicle performance data.

In some examples, the vibration level detector is to determine a second vibration level of the frame based on data received from the sensor after transmission of the instruction to the controller of the rotor. In such examples, the rotor operation analyzer is to one of maintain or adjust the operational parameter based on the second vibration level.

Another example apparatus disclosed herein includes a sensor to generate sensor data during operation of a rotor of a vehicle and a controller to determine a vibration level of at least a portion of the vehicle based on the sensor data and transmit an instruction to the rotor to one of maintain or adjust an operational parameter of the rotor based on the vibration level.

In some examples, the sensor is coupled to a frame of the vehicle proximate to the rotor.

In some examples, the sensor is a first sensor and the apparatus further includes a second sensor to generate data indicative of a rotational speed of the rotor.

In some examples, the controller is to transmit an instruction to the rotor including a first adjustment to the operational parameter of the rotor. The rotor is to operate based on the first adjustment. The controller is to determine the vibration level of the vehicle based on sensor data generated during the operation of the rotor based on the first adjustment.

In some examples, the instruction is a first instruction and the controller is to generate a second instruction including a second adjustment to the operational parameter of the rotor different from the first adjustment.

In some examples, the rotor is a first rotor and the instruction is a first instruction and the controller is transmit a second instruction to a second rotor of the vehicle to one of maintain or adjust an operational parameter of the second rotor based on the vibration level and the first instruction.

In some examples, the controller is to transmit the first instruction to the first rotor and the second instruction to the second rotor to one of synchronize or desynchronize a rotational phase between the first rotor and the second rotor.

In some examples, the controller is to generate the instruction based on the vibration level and performance data for the vehicle during operation of the rotor.

An example apparatus includes a rotor operation analyzer to determine an operational parameter of a rotor of an aircraft based on vibration of a frame of an aircraft and a communicator to transmit an instruction including the operational parameter to the rotor.

In some examples, the rotor operation analyzer is to determine the operational parameter based on a rotational speed of the rotor during operation of the rotor.

In some examples, the rotor operation analyzer is to determine the operational parameter based on an operational state of the aircraft.

In some examples, the rotor is a first rotor and the rotor operation analyzer is to determine an operational parameter for a second rotor of the aircraft based on the operational parameter for the first rotor.

In some examples, the rotor operation analyzer is to determine the operational parameter to change the vibration of the frame.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory;
   machine readable instructions; and
   at least one processor circuit to be programmed by the machine readable instructions to:
   determine a vibration level of a frame of a vehicle based on data generated by a sensor of the vehicle, the data generated when a rotational phase of a first rotor of the vehicle is in phase with a rotational phase of a second rotor of the vehicle, the vehicle including a first coaxial rotor set and a second coaxial rotor set, the first coaxial rotor set including the first rotor and the second rotor, the second coaxial rotor set including a third rotor and a fourth rotor, the first rotor and the third rotor on a first side of the frame and the second rotor and the fourth rotor on a second side of the frame, the second side opposite the first side;
   identify a resonance mode for at least a portion of the frame of the vehicle, the resonance mode associated with an operational state of the vehicle;
   determine that the vibration level exceeds a vibration level threshold when the rotational phase of the first rotor of the first coaxial rotor set is in phase with the rotational phase of the second rotor of the first coaxial rotor set;
   generate, based on the vibration level and the resonance mode, a first instruction to cause rotation of the first rotor of the first coaxial rotor set to be adjusted; and
   generate, based on the vibration level and the resonance mode, a second instruction to cause rotation of the second rotor of the first coaxial rotor set to be adjusted, at least one of the first instruction or the second instruction to cause the rotational phase of the first rotor of the first coaxial rotor set to be out-of-phase with the second rotor of the first coaxial rotor set; and
   cause the first instruction to be transmitted to a controller of the first rotor of the first coaxial rotor set and the second instruction to be transmitted to a controller of the second rotor.

2. The apparatus of claim 1, wherein the first instruction is to cause the controller of the first rotor to adjust a rotational speed of the first rotor so as to cause the rotational phase of the first rotor to be out-of-phase with the rotational phase of the second rotor.

3. The apparatus of claim 1, wherein one or more of the at least one processor circuit is to generate the first instruction based on vehicle performance data, the vehicle performance data including thrust data.

4. The apparatus of claim 1, wherein the data is first data and the vibration level is a first vibration level and one or more of the at least one processor circuit is to:
determine a second vibration level of the frame based on second data generated by the sensor after transmission of the first instruction to the controller of the first rotor or the second instruction to the controller of the second rotor and when the rotational phase of the first rotor is out-of-phase with the second rotor, and
generate a third instruction to cause the controller of the first rotor to one of maintain or adjust the rotational phase of the first rotor based on the second vibration level.

5. The apparatus of claim 1, wherein one or more of the at least one processor circuit is to generate a third instruction to cause the first rotor and the second rotor to operate at a same rotational speed when the rotational phase of the first rotor is out-of-phase with the rotational phase of the second rotor.

6. The apparatus of claim 1, wherein one or more of the at least one processor circuit is to modify the first instruction based on performance of the vehicle after the controller of the first rotor controls the first rotor based on the first instruction.

7. The apparatus of claim 1, wherein the operational state of the vehicle is one of takeoff, climb, cruise, descent, or landing.

8. The apparatus of claim 1, wherein the adjustment to the first rotor caused by the first instruction is to cause vibrations of the frame associated with a resonant frequency corresponding to the operational state of the vehicle to be canceled.

9. The apparatus of claim 1, wherein:
the vibration level is a first vibration level, the resonance mode is a first resonance mode, and one or more of the at least one processor circuit is to:
determine a second vibration level of the frame of the vehicle based on data generated after transmission of the first instruction to the controller of the first rotor or the second instruction to the controller of the second rotor and when the rotational phase of the first rotor is out-of-phase with a rotational phase of the third rotor;
determine that the second vibration level corresponds to a resonant vibration frequency of the frame;
determine that the second vibration level is caused by rotation of the first rotor at a first rotational speed and rotation of the third rotor at a second rotational speed;
generate, based on the second vibration level, a third instruction to cause one of the first rotational speed or the second rotational speed to change to a third rotational speed, the third rotational speed different than the first rotational speed and the second rotational speed; and
cause transmission of the third instruction to one of the controller of the first rotor or a controller of the third rotor to cause the one of the first rotor or the third rotor to rotate at the third rotational speed, the rotational phase of the first rotor to remain out-of-phase with the rotational phase of the third rotor when the one of the first rotor or the third rotor is rotating at the third rotational speed.

10. An apparatus comprising:
a sensor to generate sensor data during operation of a first rotor and a second rotor of a vehicle when a rotational phase of the first rotor and a rotational phase of the second rotor are synchronized, the first rotor and the second rotor being coaxial, the first rotor on a first side of the vehicle and the second rotor on a second side of the vehicle opposite the first side;
machine-readable instructions; and
at least one processor circuit to be programmed by the machine-readable instructions to:
determine a vibration level of at least a portion of the vehicle based on the sensor data;
identify a resonance mode for at least a portion of the vehicle, the resonance mode associated with an operational state of the vehicle;
determine that the vibration level exceeds a vibration level threshold when the rotational phase of the first rotor and the rotational phase of the second rotor are synchronized;
in response to the vibration level exceeding the vibration level threshold and based on the resonance mode, transmit a first instruction to the first rotor to cause a radial position of a blade of the first rotor to be adjusted to desynchronize the rotational phase of the first rotor relative to the rotational phase of the second rotor; and
transmit a second instruction to the second rotor to control rotation of the second rotor independent of the first rotor.

11. The apparatus of claim 10, wherein the sensor is coupled to a frame of the vehicle, the sensor proximate to at least one of the first rotor or the second rotor.

12. The apparatus of claim 10, wherein the sensor is a first sensor and the apparatus further including a second sensor to generate data indicative of a rotational speed of the first rotor.

13. The apparatus of claim 10, wherein the vibration level is a first vibration level associated with a first time, and one or more of the at least one processor circuit is to determine a second vibration level of the vehicle based on sensor data generated during an operation of the first rotor and the second rotor at a second time when the rotational phase of the first rotor and the rotational phase of the second rotor are desynchronized.

14. The apparatus of claim 13, wherein the adjustment to the radial position of the blade is a first adjustment to a first operational parameter of the first rotor, and wherein, based on the second vibration level, one or more of the at least one processor circuit is to generate a third instruction including (a) a second adjustment to the first operational parameter, the second adjustment different from the first adjustment, or (b) an adjustment to a second operational parameter of the first rotor.

15. The apparatus of claim 10, wherein one or more of the at least one processor circuit is to transmit a third instruction to the second rotor to one of maintain or adjust an operational parameter of the second rotor based on the vibration level and the first instruction, the third instruction different than the second instruction.

16. The apparatus of claim 10, wherein one or more of the at least one processor circuit is to cause the blade of the first rotor and a blade of the second rotor to rotate in a same rotational direction.

17. The apparatus of claim 10, wherein one or more of the at least one processor circuit is to modify the first instruction based on performance of the vehicle after the radial position of the blade of the first rotor is adjusted based on the first instruction.

18. An apparatus comprising:
   memory,
   machine-readable instructions;
   at least one processor circuit to be programmed by the machine-readable instructions to:
      identify a resonance mode for at least a portion of a frame of an aircraft, the resonance mode associated with an operational state of the aircraft;
      determine that a vibration of the frame exceeds a threshold when a first rotor of the aircraft is rotating in phase relative to a second rotor of the aircraft, the first rotor coaxial with the second rotor, the first rotor on a first side of the frame and the second rotor on a second side of the frame opposite the first side of the frame;
      determine a first operational parameter of the first rotor based on the vibration of the frame and the resonance mode;
      determine a second operational parameter of the second rotor based on the vibration of the frame and the resonance mode, one or more of the first operational parameter or the second operational parameter to cause the first rotor and the second rotor to rotate out-of-phase relative to each other; and
   interface circuitry to:
      transmit a first instruction including the first operational parameter to the first rotor; and
      transmit a second instruction including the second operational parameter to the second rotor.

19. The apparatus of claim 18, wherein one or more of the at least one processor circuit is to determine the first operational parameter based on a rotational speed of the first rotor during operation of the first rotor.

20. The apparatus of claim 18, wherein one or more of the at least one processor circuit is to determine the second operational parameter for the second rotor based on the first operational parameter for the first rotor.

21. The apparatus of claim 18, wherein one or more of the at least one processor circuit is to determine the first operational parameter to cause the vibration of the frame to change.

22. The apparatus of claim 18, wherein the resonance mode is an expected resonant vibration frequency corresponding to the operational state of the aircraft and one or more of the at least one processor circuit is to determine the first operational parameter or the second operational parameter based on the expected resonant vibration frequency.

* * * * *